United States Patent [19]

Lichtman

[11] 4,017,146
[45] Apr. 12, 1977

[54] TRANSMITTER FOR USE IN A LASER COMMUNICATION AND RANGING SYSTEM

[75] Inventor: Samuel W. Lichtman, San Diego, Calif.

[73] Assignee: The United States of America as represented by the Secretary of the Navy, Washington, D.C.

[22] Filed: Mar. 4, 1976

[21] Appl. No.: 663,884

[52] U.S. Cl. .................................. 350/7; 250/199; 343/7.3; 356/4
[51] Int. Cl.² ..................................... G02B 27/17
[58] Field of Search .............. 350/6, 7; 356/11, 16, 356/222, 4, 5, 7; 331/94 K; 250/199; 178/7.6, DIG. 1, 6.7; 343/7.3

[56] References Cited

UNITED STATES PATENTS

| 3,623,795 | 11/1971 | Taylor | 350/DIG. 2 |
| 3,630,616 | 12/1971 | Everest | 356/4 |
| 3,762,791 | 10/1973 | Fournier et al. | 350/6 |

FOREIGN PATENTS OR APPLICATIONS

| 1,334,123 | 10/1973 | United Kingdom | 350/6 |

Primary Examiner—John K. Corbin
Assistant Examiner—B. Wm. delos Reyes
Attorney, Agent, or Firm—R. S. Sciascia; G. J. Rubens; T. M. Phillips

[57] ABSTRACT

A transmitter for extending the operational range capability of laser communications and ranging systems. A narrow laser beam is angle deflected to provide a raster scan equivalent to a broad beam scan.

5 Claims, 5 Drawing Figures

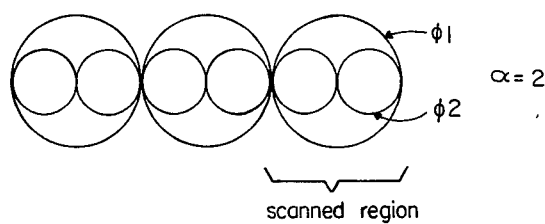
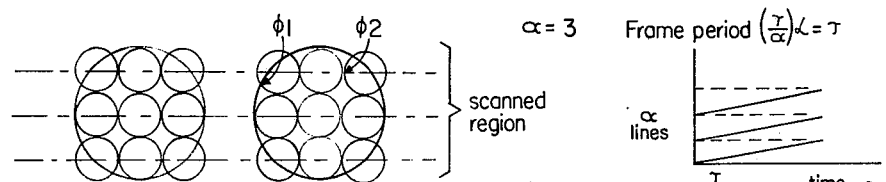
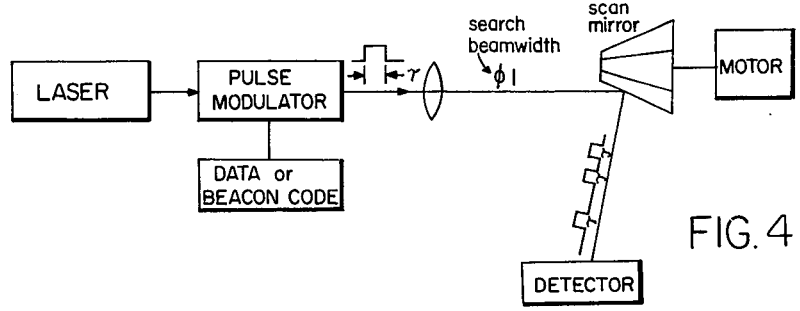
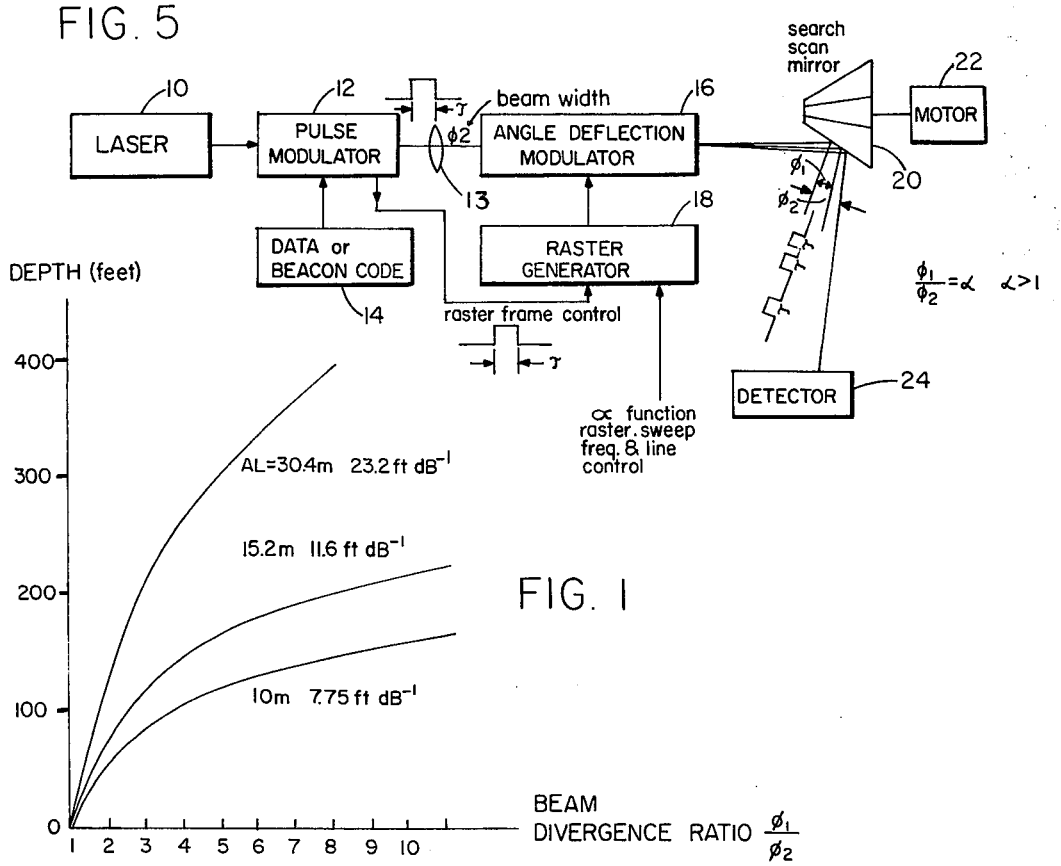

TRANSMITTER FOR USE IN A LASER COMMUNICATION AND RANGING SYSTEM

BACKGROUND OF THE INVENTION

A broad beam is normally required during the search mode to provide area coverage and to satisfy time on target needs for acquisition purposes. Use of a broad beam, however, reduces the potential operating range by diluting the energy over a large spatial-angular region. This loss in range potential is especially severe for propagation through glossy mediums such as seawater.

In presently known air to undersea communication systems, the ratio of laser beam divergent angle between search and track modes is around four. Extremes in the choice of beam angle for operation at different altitudes is also typically on the order of eight.

The beam power density, $S_r$, at the receivers can be expressed as;

$$S_r = \frac{P e^{-kd}}{\frac{\pi}{4} (\phi h)^2} \quad (1)$$

$P$ = beam power
$\phi$ = beam divergence
$d$ = water depth
$h$ = air path   where $h \gg d$
$k$ = diffuse attenuation coefficient, water Equation (1) shows that P is proportional to $(\phi h)^2$ for constant $S_r$ and $kd$. For a given height, $h$, reducing $\phi$ by a factor of 2 is equivalent to increasing P by a factor of 4. More generally the effect upon P of a change in $\phi$ from $\phi_1$ to $\phi_2$ is expressed by $$dB = 20 \log \phi_1/\phi_2 \quad (2)$$

where dB enhances P for $\phi_1 > \phi_2$.

One attenuation length, AL, is equal to 4.34 dB. Equation (2) is therefore expressable as a change in depth, $\Delta d$, $$\frac{\Delta d}{AL \text{ units}} = \frac{20}{4.35} \log \frac{\phi_1}{\phi_2} = 4.61 \log \frac{\phi_1}{\phi_2} \quad (3)$$

Equation (2) or (3), as applied to three types of water, is shown in the graph of FIG. 1.

SUMMARY OF THE INVENTION

The present invention provides a means for extending the operational range capability of laser systems. A modulated laser beam is optically condensed to a beam width of high intensity and then by angle deflection is caused to scan in a predetermined manner to provide coverage of the area in which the receiver and detector are located.

During a beam pulse period, $\tau$, the beam is swept out over a maximum deflection angle $\phi$ at a ramp rate $f = \alpha/\tau$. The raster generator for generating the deflection signal is triggered by the onset of the beam pulse from the modulator.

Accordingly, an object of the invention is to provide an improved laser transmitting system which extends the operational range capability beyond those of prior known systems.

Another object of the invention is the provision of a laser transmitter having extended penetration into seawater by trigger angle deflection of a narrow-beam during the search mode.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a plot of beam divergence ratio $\phi_1/\phi_2$ to depth change in three types of water;

FIG. 2 shows a comparison of narrow beam deflection, $\phi_2$ compared with wide beam scanning, $\phi_1$.

FIG. 3 is a graph of narrow beam scanning in a raster pattern.

FIG. 4 is a block diagram of a system for generating the scan beam $\phi_1$.

FIG. 5 is a block diagram of the preferred embodiment of the invention.

DESCRIPTION OF THE PREFERRED EMBODIMENTS

Referring now to FIG. 5 wherein there is shown a laser 10 for providing a laser beam that is pulse modulated by pulse modulator 12 in accordance with data or beacon code supplied from the source 14. After being pulse modulated the laser beam is focused by means of optics 13 to form a tight beam width, $\phi 2$. The beam out of optics 13 is deflected in a raster format in angle deflection modulator 16 by means of applying a raster signal from raster generator 18 triggered by the start of pulse from pulse modulator 12. The deflected beam is reflected by means of a search scan mirror 20 driven by a motor 22 to a remote receiver which includes a detector 24. A pulse modulated, high energy beam is provided for detection as shown.

As shown in FIG. 4, a system for transmitting information by means of a laser system is shown where the beam width $\phi 1$ in the search mode is a broad beam and covers the area as shown by $\phi 1$ in FIGS. 2 and 3. After lock-on the beam $\phi 1$ is then switched to a narrow beam for transmission of intelligence. The improved system of FIG. 5 utilizes a narrow or tight beam width during the search mode as well as in the communication mode. The present invention discloses only the system for transmitting in the search mode. Lock-on and switching from the search mode to the track mode are accomplished in the well known manner and this portion of the system is not described.

By means of triggered angular deflection of the tight beam, $\phi 2$ beam (also called dithering) the tight beam is spread out sequentially over the same linear angular dimension and thereby over the same detector illumination scan as would be covered by a broad beam, $\phi 1$, without the angular deflection. This is shown in FIG. 2 and 3.

For an angular ratio $\alpha = \phi 1/\phi 2$, an area scanned during pulse period, $\tau$, requires a raster field scan pattern provided by means of a raster generator 18 which consist of $\alpha$ lines per raster frame.

The search area for pulse period $\tau$, of angular beam width area $A\phi_1$ is maintained constant for angular beam width area $A\phi_2$, where $A\phi_1/A\phi_2 = \alpha$ and $\alpha$ is greater than 1, when $A\phi$ is scanned in a raster pattern consisting of $\alpha$ lines and $\alpha$ line deflection elements that occur in time, $\tau$. Spot area time resolution is therefore $\tau\alpha^2$ for constant area scan during a pulse period $\tau$.

The time for the search beam to move across its beam width region and pulse period $\tau$, remains unchanged for either $\phi1$ (no raster) or $\phi2$ (raster deflection) modes of operation. The time on target, or dwell period, during each pulse, therefore remains unchanged for either operational mode. Area illumination and dwell period, as determined by the time for the search scan vector to pass through the pulse-beam region, thereby remain unchanged for either broad beam $\phi1$, operation or for raster-dithered deflection of a narrow beam, $\phi2$.

Without dither, the angular region $\phi1$ is fully illuminated during the beam pulse period, $\tau$. All segments of this region are thereby simultaneously available for photo detection by a remote receiver. With dither, and over the same pulse interval, $\tau$, the beam angular deflection coverage is increased by $\phi1/\phi2 = \alpha$. For raster coverage of the $\phi1$ field using a $\phi2$ beam, instantaneous signal returns from the $\phi2$ field are swept by the photodetector in a shorter time interval, corresponding to $\tau/\alpha2$. For either mode of operation, it is assumed that the transit response of the receiver photodetector (shown as detector 24) is adequate for recovery of full peak amplitude despite a reduction in signal duration from $\tau$ to $\tau/\alpha^2$. Since the instantaneous peak value of beam power remains constant for either mode of operation the peak value of the pulse beam is equally recoverable with or without the operation. For compatibility with dither operation, the photodetector response time must have a transit rise time consistent with a reduction in onset time of the signal pulse by factor of $\alpha^2 = (\phi1/\phi2)^2$. Search area enhancement resulting from an angular deflection $\alpha = \phi1/\phi2$, is in effect acquired as a trade-off resulting from a reduction in the transit rise time expectancy of the detector by factor $\alpha^2$.

Typical optical sensors used in a receiving station have pulse rise times on the order of 10 nanoseconds (i.e., Westinghouse 95948 Photomultiplier, 2–3 nanoseconds, and UDC Si Photodetector, 5–10 ns). Therefore for application of an $\alpha$ value of 8, representing a typical design extreme situation as mentioned above, calls for a maximum initial $\tau$ value (with no dither) of $8^2 \times 10^{-8}$ or 0.64 microseconds.

In practicing the invention pulse modulator 12 may be of the Pockels type or of the Kerr cell type. Angle deflection modulator 16 may be of the ISOMET Corporation Model LD-400T type to provide an angular deflection range of 41.7 mrad at 514.nm, and has a 50 Hz bandwidth capability.

A system for extending the range capability has been disclosed of a laser information transmission system which retains use of a narrow-beam divergence angle at all times, in order to maximize the operational range capability during the search mode. This is accomplished by a triggering a raster mode deflection of a tight beam, employing a raster frame period equal to the pulse duration, and an angular beam-dither raster field matching the broad-beam angular-field without dither. During each pulse interval the optical beam is spread out over the same solid angular area and thereby covers the same detector region as occurs for broad beam operation without angular beam-dithered raster-mode operation.

Obviously many modifications and variations of the present invention are possible in the light of the above teachings. It is therefore to be understood that within the scope of the appended claims the invention may be practiced otherwise than as specifically described.

What is claimed is:

1. For use in a laser communication and ranging system a transmitter for extending the operational range capability comprising:
   a. a laser beam source;
   b. pulsed modulator means for receiving said laser beams and providing a modulated beam output containing encoded data;
   c. optical focusing means for receiving said modulated beam for focusing said beam to a predetermined narrow beam width,
   d. angle deflection modulator means for receiving said beam and deflecting said beam in a predetermined raster scan of an operational area equivalent to a broad beam scan, said angle deflection means including a ramp generator coupled to said pulse modulator and being triggered by the onset and for the duration of each beam pulse;
   e. search scan mirror means for reflecting said beam to an area of interest.

2. The transmitter of claim 1 wherein said angle deflection modulator means further comprises an electro-optical modulator for receiving the pulsed beam from said pulse modulator and coupled to said ramp generator for controlling said pulsed beam in said raster format.

3. The transmitter of claim 2 wherein the raster frame control is controlled by the duration of the widths of the beam pulses.

4. A method of extending the operational range capability of a laser communication and ranging system which comprises:
   a. providing a pulsed modulated laser beam of solid angle beam width $\phi_2$
   b. angle deflecting said pulsed modulator beam to scan a solid angular region, $\phi_1$, for the duration of each modulating pulse, where $\phi_1/\phi_2 > 1$,
   c. detecting signal returns from the $\phi_2$ field by sweeping with a photodetector in a shorter time interval, corresponding to $\gamma/\alpha^2$, where $\alpha = \phi_1/\phi_2$.

5. The method of claim 4 wherein in said detecting step a photodetector is utilized with a transit rise time consistent with a reduction in onset time of the pulsed signal by a factor of $(\phi_1/\phi_2)^2$.

* * * * *

UNITED STATES PATENT AND TRADEMARK OFFICE
CERTIFICATE OF CORRECTION

PATENT NO. : 4,017,146
DATED : April 12, 1977
INVENTOR(S) : Samuel W. Lichtman

It is certified that error appears in the above-identified patent and that said Letters Patent are hereby corrected as shown below:

Column 1, line 12, "glossy" should read -- lossy --;
Column 1, equation (3) should appear as follows:

$$\frac{\Delta d}{\Delta L \text{ units}} = \frac{20}{4.34} \log \frac{\phi_1}{\phi_2} = 4.61 \log \frac{\phi_1}{\phi_2}$$

Column 2, line 61, "sist" should read -- sists --;
Column 2, line 68, "$\tau\alpha^2$" should read -- $\tau\alpha^{-2}$ --;
Column 3, line 21, "$\tau/\alpha 2$" should read -- $\tau\alpha^{-2}$ --;
Column 3, line 49, "Hz" should read -- MHz --;
Column 4, line 19, "beams" should read -- beam --;
Column 4, line 52, "$\gamma/\alpha^2$" should read -- $\tau/\alpha^2$ --.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*